F. T. CADMUS, Jr.
RUNNING GEAR OF VEHICLES.
APPLICATION FILED MAY 2, 1921.
1,403,288. Patented Jan. 10, 1922.
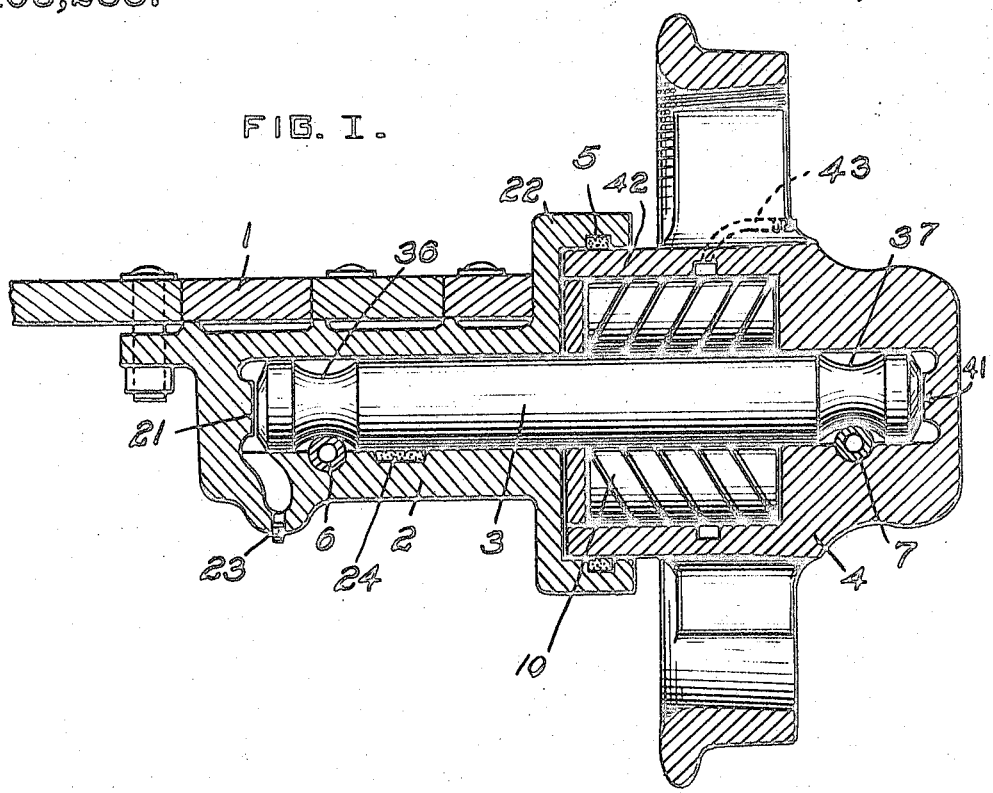
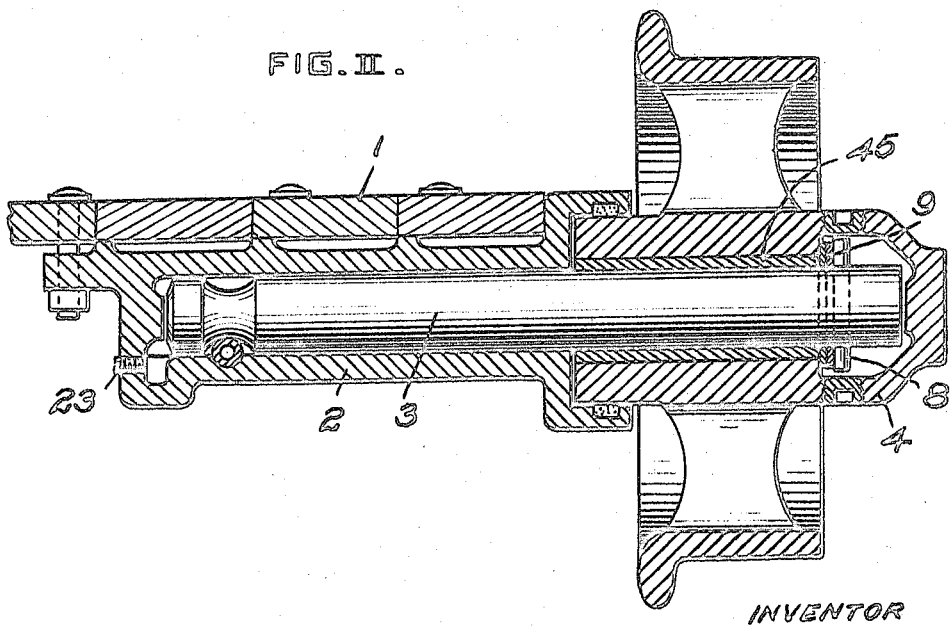

UNITED STATES PATENT OFFICE.

FREDERICK T. CADMUS, JR., OF FAIRMONT, WEST VIRGINIA.

RUNNING GEAR OF VEHICLES.

1,403,288.  Specification of Letters Patent.  Patented Jan. 10, 1922.

Application filed May 2, 1921. Serial No. 466,149.

*To all whom it may concern:*

Be it known that I, FREDERICK T. CADMUS, Jr., residing at Fairmont, in the county of Marion and State of West Virginia, a citizen of the United States, have invented or discovered certain new and useful Improvements in Running Gears of Vehicles, of which improvements the following is a specification.

My invention relates to improvements in the running gear of vehicles; it is particularly applicable to the construction of mine cars; for in mines track structure is relatively light, temporary, and insecure, and the accidental strains of service are, in comparison with the weight and proportions of the running gear, severe. The objects in view are simplicity and durability.

In the accompanying drawings Fig. I is a view in vertical and central section through the running gear (so far as concerns a single wheel) of a mine car, in which running gear my invention is embodied; Fig. II is a like view, of another structure, which by its modification indicates in some degree the adaptability of my invention.

Referring first to Fig. I, a portion of the frame work of a car is indicated at 1; 2 is the axle box; 3 is the axle; and 4 the wheel. The axle box is an inside axle box; that is to say, it is arranged on the inner side of the wheel which it carries—an arrangement which in mine car service is preferred. This axle box is as will be observed, bolted to the car; the axle is mounted to turn in the axle box; and the wheel is mounted to turn on the axle. The axle is an individual axle, for a single wheel. Accordingly the axle box is closed at its inner end, and has formed within it at this closed inner end a bearing surface 21, to sustain longitudinal thrust of the axle in inward direction. The wheel forms a closure over the outer end of the axle box. The hub portion of the wheel is elongated and hollow; the recess is axial in extent, cylindrical and is closed at the outer end. The closing wall is shaped to form a bearing surface 41, to sustain outwardly directed longitudinal thrusts of the axle. The space within the axle box and the recess within the hub of the wheel are so arranged and so proportioned as to come into register, one with the other at their open ends.

The parts are provided with overlapping flanges, 42 and 22, between which packing 5 may be introduced. Axle box and wheel, then, when assembled form a closed chamber which will be understood to be essentially cylindrical. This cylindrical chamber is of substantial extent longitudinally, both within axle box and within wheel hub. Indeed, the wheel hub is built out on this account on either side of the wheel, to afford properly elongated bearing surfaces for the axle. Within this cylindrical chamber the axle 3 is closely contained. The proportions are such that, with small and sufficient play, its opposite ends stand opposite the bearing surfaces 21 and 41, already described. Axle 3 is so secured to axle box 2 on the one hand and to wheel 4 on the other as to hold the parts secure against wide displacement in the direction longitudinal of the axle, and at the same time to permit free turning in two particulars: free turning of axle in axle box, and free turning of wheel on axle. The particular means for so securing the parts are in Fig. I shown to be pins 6 and 7 set, one of them in axle box 2 and the other in wheel 4, and extending when the parts are assembled longitudinally of grooves 36 and 37 encircling axle 3. In Fig. II I show another means for securing the parts, namely a cotter pin 8 and washers 9 arranged between cotter pin and a surface of the wheel body 4 extending in a plane transverse to the length of the axle. Whatever be the particular means of articulating axle with axle box on the one hand and with wheel on the other, a sufficient amount of play will be provided for, in a direction longitudinal of the axle, so that when the car swings laterally the stress of outward thrust will be sustained by the axle borne upon compressively between bearing surfaces 21 and 41. The stress of swing in opposite direction will of course be similarly sustained by a like structure on the opposite side of the car. In a word the function of the pins 6 and 7, or their equivalent, is merely to articulate; the strains of service are otherwise sustained.

It need scarcely be added in view of what has just been said that the axle box and its anchorage, the axle and the wheel are such in their proportions and strength as to endure the stresses and strains alluded to.

The chamber formed by and between axle box and wheel—the chamber within which, as has been said, the axle is wholly contained and enclosed—constitutes a containing chamber for lubricant, with which manifestly the surfaces between which there is turning motion may always be kept flushed. Furthermore, these surfaces and the body of lubricant too, are wholly protected from the ingress of dust and other gritty matter. Ducts for introducing and removing lubricant from this chamber are indicated at 23 and 43, the one extending through the body of the axle box, the other through the body of the wheel. Either or both such ducts may be provided. The ducts will of course be properly covered with removable closures. A lubricant well 24 in the axle box may or may not be provided.

Fig. I shows bearing rollers 10 interposed between wheel and axle; Fig. II shows surface to surface bearing of wheel upon axle. Bearing rollers are now commonly employed between the turning parts in mine car running gear, and manifestly my invention admits freely of their use. I desire, however, to note that, in consequence of my invention, providing as it does a double turning (between wheel and axle and between axle and axle box), and providing further a structure in which the bearing surfaces may be flushed always with lubricant, the desirability of roller bearings or of equivalent structure is not so pronounced, and they may, as Fig. II indicates, be eliminated. The bushing 45 within the hub of the wheel of Fig. II is a familiar and obvious detail.

Endwise wear upon the bearing rollers 10, when present, is (it should parenthetically be remarked) prevented by the arrangement which causes axle 3 to be engaged between bearing surfaces 21 and 41.

The double union relieves the axle of the wearing effect of strains otherwise concentrated at the point where it carries the wheel, and generally is more flexible and minutely responsive to the strains of service.

I claim as my invention:

1. In running gear for a vehicle a three-part structure, consisting essentially of an axle box, a wheel and an axle, the axle box containing a cylindrical recess open at the outer end and closed by an integral wall at the inner end, the wheel being provided in its hub portion with an outwardly closed axial recess and forming together with the axle box, a closed chamber within which the axle is wholly contained.

2. In running gear for a vehicle an inside axle box containing an elongate chamber closed inwardly by an integral wall, said box being adapted to be secured to the vehicle body, a wheel provided in its hub portion with an outwardly closed axial recess, said axle box and wheel when assembled forming a closed chamber, and an axle contained wholly within such chamber and articulated with both of the two aforenamed parts.

3. In running gear for a vehicle the combination of an axle box provided with a cylindrical recess closed at one end with a thrust wall, a wheel provided with a cylindrical axial recess closed at one end with a thrust wall, and an axle engaging both of said recesses, and extending when the parts are assembled into proximity with the opposite thrust walls of the combined recess, said axle being articulated to both the aforenamed parts, in a union permitting play in longitudinal direction.

In testimony whereof I have hereunto set my hand.

FREDERICK T. CADMUS, Jr.

Witnesses:
L. N. BURDOL,
M. ELKINS.